Dec. 27, 1938.  W. A. MOULD  2,141,760
IMITATION DRINK
Filed Aug. 1, 1938  2 Sheets-Sheet 1

INVENTOR
WILLIAM ANGELL MOULD
BY
ATTORNEY

Dec. 27, 1938.  W. A. MOULD  2,141,760
IMITATION DRINK
Filed Aug. 1, 1938  2 Sheets-Sheet 2

INVENTOR
WILLIAM ANGELL MOULD
BY
ATTORNEY

Patented Dec. 27, 1938

2,141,760

UNITED STATES PATENT OFFICE 2,141,760

IMITATION DRINK

William Angell Mould, Loughborough Junction, Camberwell, London, England, assignor to Try-it Novelty Company, Brooklyn, N. Y., a partnership of New York composed of William A. Mould, David Grifka, and William Prince Application August 1, 1938, Serial No. 222,414

7 Claims. (Cl. 272—8)

This invention relates to an imitation container of beer or wine with accurate reproduction of both form and color, which is so compounded and constructed as to prevent spilling. Furthermore a novel means is used to prevent evaporation of moisture from the content, so as to produce a permanency.

The principal object of the invention is to provide an imitation of a drink which is so accurate in its form that it cannot be easily detected, and therefore may be mixed among a number of real drinks and used as a joke to deceive one of the guests. Furthermore, it may be used for display purposes where a permanency is required that could not be obtained by a genuine drink.

This application forms a continuation in part of my pending application Serial No. 194,034, filed March 5, 1938, titled Joke beers.

The details of construction of my device will be better understood by reference to the accompanying drawings, in which.

Similar reference numerals refer to similar parts throughout the drawings.

Figure 1:
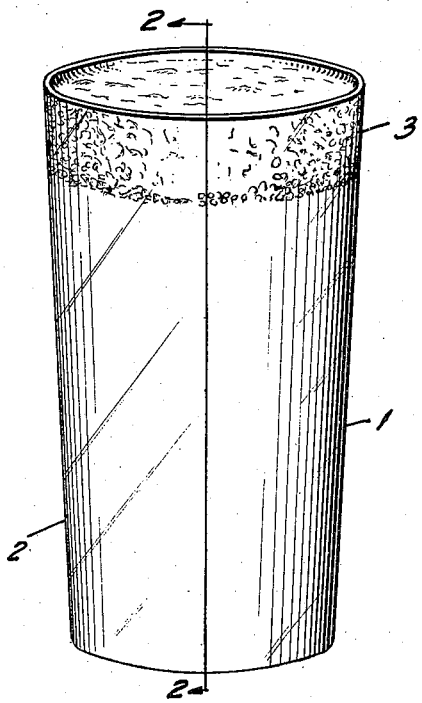
Figure 1 is a perspective view of a glass of beer.
Figure 2:
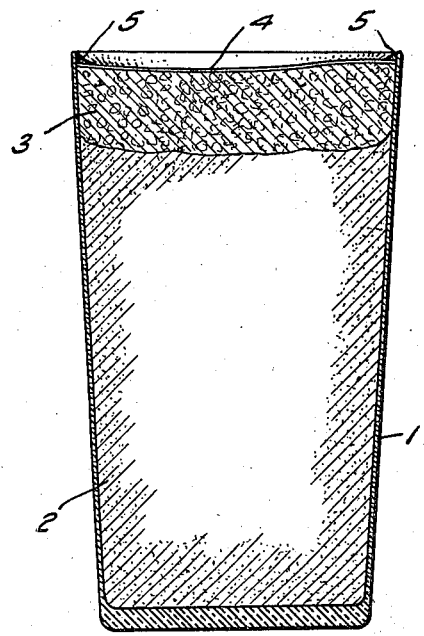
Figure 2 is a section taken on the line 2—2 in Figure 1.
Figure 5:
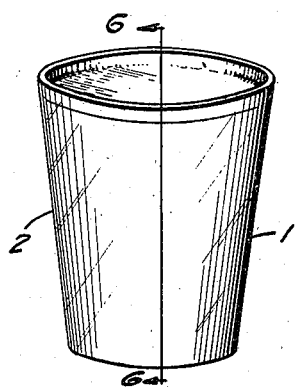
Figure 5 is a perspective view of a glass of whiskey.
Figure 6:
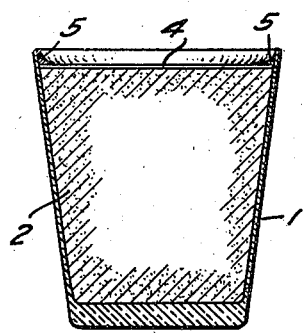
Figure 6 is a section taken on the line 6—6 in Figure 5.
Figure 3:
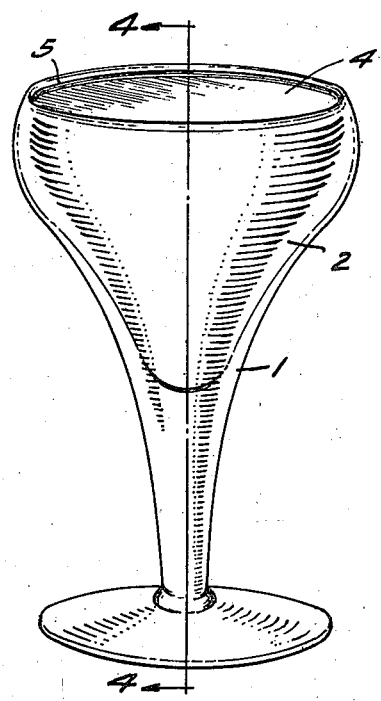
Figure 3 is a perspective view of a cocktail in its container.
Figure 4:
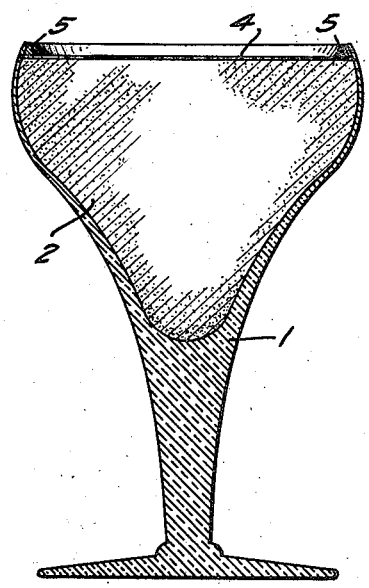
Figure 4 is a section taken on the line 4—4 in Figure 3.

In the drawings, 1 is a container which may be any form, such as a beer glass, cocktail glass, whiskey glass, or other shape suited to the particular drink being imitated. 2 is a body material which is preferably made from gelatine or glue, which has the coloring to match the drink being imitated. 3 is a foam which is also a glue or gelatine material which has been whipped or aerated in such a manner as to produce a foam. This foam may be made in accordance with my prior application referred to, or may be made without the bicarbonate of soda referred to and disclosed in that application. 4 is a transparent seal which is applied over the top of the foam 3. This seal may be any transparent material such as nitrocellulose, cellulose acetate, or any of the transparent cellulose compounds, or may be from transparent rubber, or any other film which would prevent the normal evaporation of the liquid from the gelatine. 5 is a sealing material such as nitrocellulose glue, cellulose cut with acetone, or any other adhesive which will seal the element 4 to the element 1. Referring to Figures 3 and 5, wherein drinks are shown which do not have foam, the transparent seal 4 is placed directly on top of the gelatine 2, and the foam is omitted. The seals 4 in these instances are likewise fastened to the container 1 by a transparent adhesive 5, in the manner exactly as disclosed in connection with Figures 1 and 2. The gelatine or glue content in any of these instances will shrink as the water evaporates from them, and I have found it necessary to provide this seal in order to check this evaporation.

Another point which I have investigated and developed is a means to raise the melting point of the gelatine or glue. Ordinary gelatine or glue will melt at a fairly low temperature, and I have found it essential to include in the mixing of the gelatine or glue an equal amount of formaldehyde in a liquid form which will raise the melting point to approximately 212 degrees Fahrenheit. The preferred formula therefore consists of equal parts of gelatine or glue and liquid formaldehyde, to which is added any desired amount of water which may run to a ratio as high as thirty-six pounds of water to one pound of gelatine and one pound of formaldehyde. Obviously the water content may be greatly reduced with equal results.

It will be noted that in using gelatine for both the liquid content of the drink as well as the foam, I have eliminated all liquids so that there can be no spilling.

It is to be further understood that the transparent seal which prevents evaporation may be tinted in order to more nearly conform to the color of the drink being imitated.

Having described my invention, what I claim as new and desire to secure by Letters Patent is:

1. An imitation glass of beer consisting of a solid material imitating the liquid and foam of beer.

2. An imitation of a glass of beer consisting of a container, colored gelatine in the container, aerated foam disposed above the said colored gelatine, a transparent moisture retarding cover placed over the said foam and sealed to the container.

3. An imitation of a glass of beer consisting of a container, a colored gelatine compound consisting of gelatine, formaldehyde, and water in the container, an aerated foam made from the same compound disposed above the said colored compound, a moisture resisting seal disposed above the foam and sealed to the container.

4. An imitation of a glass of beer, consisting of a transparent container, colored gelatine in the container, aerated foam disposed above the said colored gelatine, a transparent moisture retarding cover placed over the said foam and sealed to the container.

5. An imitation of a glass of beer consisting of a transparent container, a colored gelatine compound consisting of gelatine, formaldehyde, and water in the container, an aerated foam made from the same compound disposed above the said colored compound, a moisture resisting seal disposed above the foam and sealed to the container.

6. An imitation of a drink, consisting of a container, colored gelatine in the container, a transparent moisture retarding cover placed over the said gelatine and sealed to the container by adhesion.

7. An imitation of a drink, consisting of a transparent container, colored gelatine in the container, a transparent moisture retarding cover placed over the said gelatine and sealed to the container by adhesion.

WILLIAM ANGELL MOULD.